United States Patent [19]

Sawamoto et al.

[11] Patent Number: 4,780,107
[45] Date of Patent: Oct. 25, 1988

[54] FIBER REACTIVE DIOXAZINE COMPOUND HAVING FOUR VINYLSULFONE TYPE REACTIVE GROUPS

[75] Inventors: Hirokazu Sawamoto, Minoo; Naoki Harada, Suita; Takashi Omura, Ashiya, all of Japan

[73] Assignee: Sumitomo Chemical Company, Limited, Osaka, Japan

[21] Appl. No.: 151,580

[22] Filed: Feb. 2, 1988

[30] Foreign Application Priority Data

Feb. 24, 1987 [JP] Japan .................. 62-42223

[51] Int. Cl.⁴ .................. C09B 62/04; C07D 498/00
[52] U.S. Cl. .................. 8/657; 8/543; 8/549; 544/75; 544/76
[58] Field of Search .................. 8/657, 543, 549, 917, 8/918, 924; 544/75, 76

[56] References Cited

U.S. PATENT DOCUMENTS

| | | | |
|---|---|---|---|
| 3,223,470 | 12/1965 | Boedeker et al. | 8/549 |
| 3,996,221 | 12/1976 | Leng et al. | 544/75 |
| 4,568,350 | 2/1986 | Rohrer | 8/549 |
| 4,631,065 | 12/1986 | Seitz et al. | 8/549 |
| 4,665,179 | 5/1987 | Wunderlich et al. | 544/75 |
| 4,693,725 | 9/1987 | Yamauchi et al. | 8/657 |
| 4,705,524 | 11/1987 | Hähnke et al. | 8/549 |

FOREIGN PATENT DOCUMENTS 60-18359 5/1985 Japan .
0171611 2/1986 European Pat. Off. .

OTHER PUBLICATIONS

Science & Industry, vol. 42, No. 11 (1968), pp. 583-594.

*Primary Examiner*—Paul Lieberman
*Assistant Examiner*—Helene Kirschner
*Attorney, Agent, or Firm*—Stevens, Davis, Miller & Mosher

[57] ABSTRACT

A dioxazine compound represented by the following formula (I) in the free acid form,

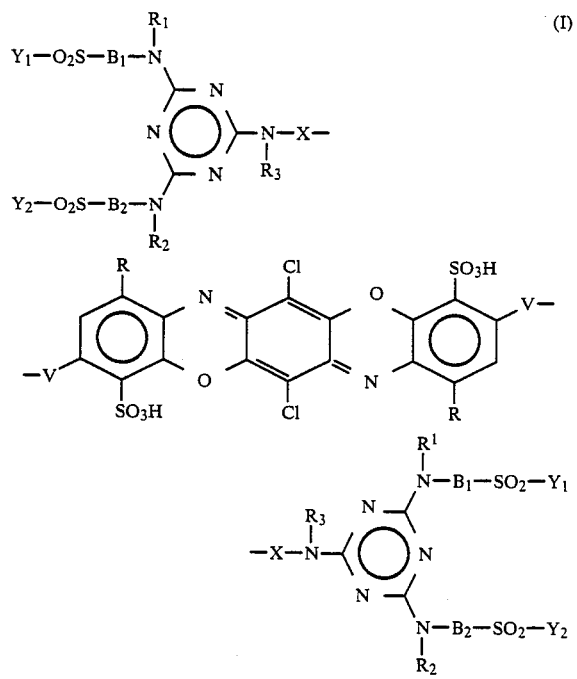

wherein R is hydrogen, halogeno, alkyl, alkoxy or sulfo, V is a direct linkage or

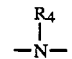

in which $R_4$ is hydrogen or alkyl, X is a direct linkage or an aliphatic, araliphaatic or aromatic bridging group, $B_1$ and $B_2$ independently of one another are each phenylene or naphthylene, $Y_1$ and $Y_2$ independently of one another are each —CH=CH$_2$ or —CH$_2$CH$_2$Z in which Z is a group splittable by the action of an alkali, and $R_1$, $R_2$ and $R_3$ independently of one another are each hydrogen or alkyl, which is useful for dyeing or printing fiber materials such as cellulose fiber materials to give dyed or printed products of a deep blue color superior in fastness properties.

11 Claims, No Drawings

FIBER REACTIVE DIOXAZINE COMPOUND HAVING FOUR VINYLSULFONE TYPE REACTIVE GROUPS

The present invention relates to a dioxazine compound, a process for producing the same and a process for dyeing or printing fiber materials using the same.

More specifically, the present invention relates to a water-soluble dioxazine compound having four vinylsulfone type fiber reactive groups per molecule, which is particularly useful for dyeing or printing hydroxyl or amide group-containing materials such as cellulose, polyamide and polyurethane fibers.

Reactive dyes, particularly those having the vinylsulfone type fiber reactive group have been extensively used for dyeing or printing cellulose and polyamide fibers, because of their characteristic features such that they can be applied to various kinds of dyeing or printing methods and can give dyed or printed products of a brilliant color shade having good wet fastness.

Dioxazine reactive dyes of this kind are known as disclosed in, for example, U.S. Pat. No. 3,223,470, British Pat. No. 1,368,158 and Published Examined Japanese Patent Application No. 60-18,359.

However, these known reactive dyes can hardly give dyed or printed products of a deep color because of their insufficient build-up property, so that dyeing efficiency in dye houses decreases from viewpoint of dyeing cost and treatment of waste water. Thus, they await improvements particularly in this respect.

The present inventors have undertaken extensive studies to find a dioxazine compound superior in various dye performance such as fastness properties, level-dyeing properties, water-solubility and the like as well as build-up property, and as a result have found the fact that a specific dioxazine compound can meet needs described above.

The present invention provides a dioxazine compound represented by the following formula (I) in the free acid,

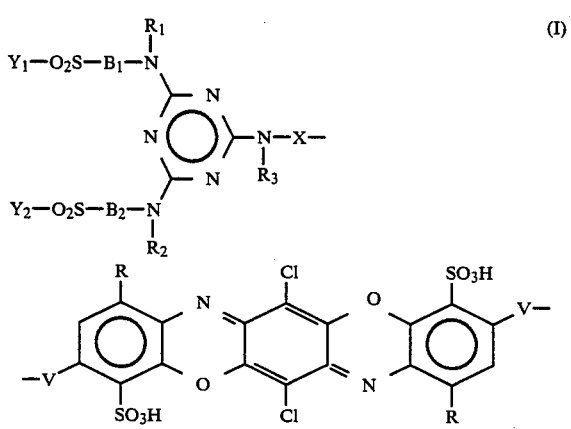

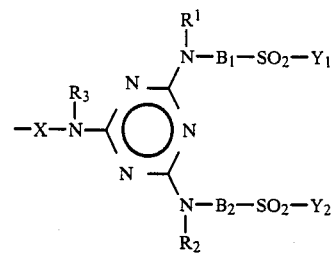

wherein R is hydrogen, halogeno, alkyl, alkoxy or sulfo, V is a direct linkage or

in which $R_4$ is hydrogen or unsubstituted or substituted alkyl, X is a direct linkage or an aliphatic, araliphatic or aromatic bridging group, $B_1$ and $B_2$ independently of one another are each unsubstituted or substituted phenylene or naphthylene, $Y_1$ and $Y_2$ independently of one another are each —CH=CH$_2$ or —CH$_2$CH$_2$Z in which Z is a group splittable by the action of an alkali, and $R_1$, $R_2$ and $R_3$ independently of one another are each hydrogen or unsubstituted or substituted alkyl, and a process for producing the dioxazine compound of the formula (I), which comprises subjecting any one of an intermediate dioxazine compound represented by the following formula (II) in the free acid form,

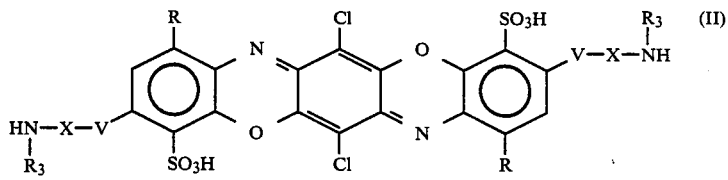

wherein R, V, X and $R_3$ are as defined above, an amine compound represented by the following formula (III),

wherein $B_1$, $Y_1$ and $R_1$ are as defined above, and another amine compound represented by the following formula (IV),

wherein $B_2$, $Y_2$ and $R_2$ are as defined above, to first condensation reaction with a cyanuric halide, followed by second and third condensation reactions using the remaining ones.

The present invention also provides a process for dyeing or printing hydroxyl or amide group-containing materials, which comprises using the dioxazine compound of the formula (I).

In the above formula (I), the alkyl and alkoxy represented by R are preferably those having 1 to 4 carbon atoms, and the halogeno includes chloro, bromo and the like. With respect to the symbol R, preferred are, for example, chloro, bromo, methyl, ethyl, methoxy, ethoxy and sulfo.

With respect to the symbol X, the aliphatic bridging group may be straight, branched or cyclic, and may be unsubstituted or substituted by sulfo, carboxy, methyl, methoxy or optionally substituted phenyl. Moreover, the said aliphatic group may contain a hetero atom in the chain. Examples thereof are as follows;

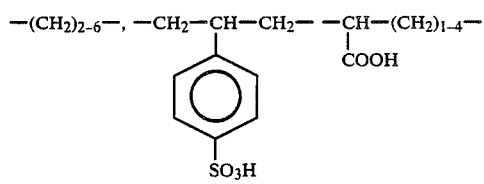

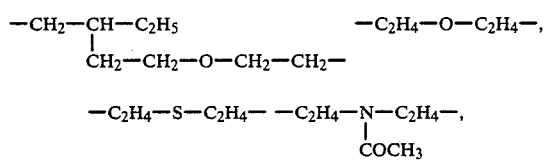

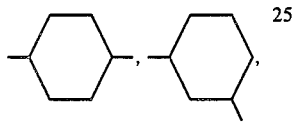

The araliphatic bridging group may be unsubstituted or substituted by sulfo, carboxy, methyl, methoxy or optionally substituted phenyl, and may contain a hetero atom in the aliphatic chain. Examples thereof are as follows;

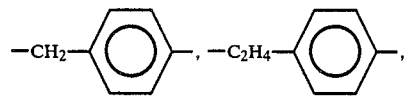

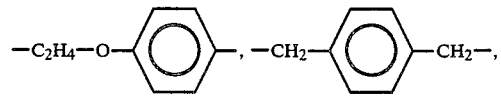

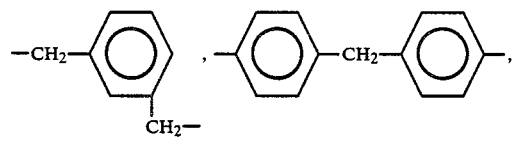

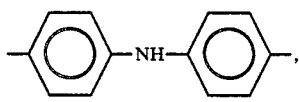

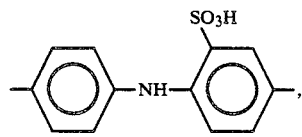

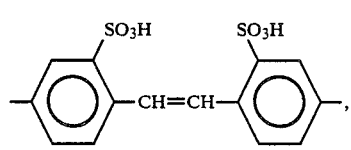

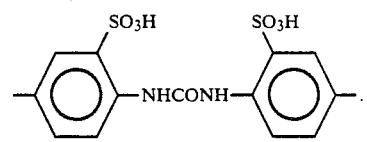

The aromatic bridging group may be unsubstituted or substituted by sulfo, carboxy, methyl, methoxy or optionally substituted phenyl. Examples thereof are as follows;

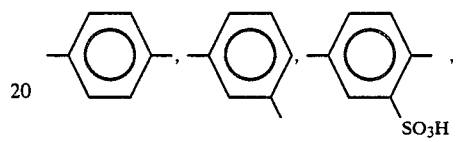

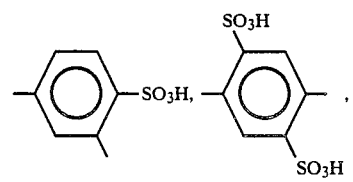

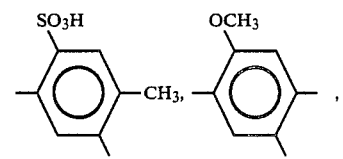

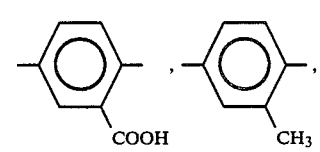

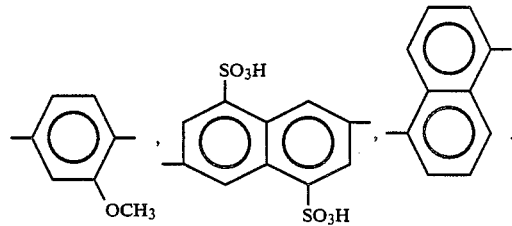

Of these bridging groups represented by the symbol X, preferred are $C_{2-6}$ alkylene, particularly such as ethylene and propylene, and phenylene unsubstituted or substituted once or twice by sulfo.

With respect to the symbols $B_1$ and $B_2$, the phenylene may be unsubstituted or substituted once or twice by methyl, ethyl, methoxy, ethoxy, chloro, bromo, nitro, sulfo or carboxy, and the naphthylene may be unsubstituted or substituted once by sulfo. Examples thereof are as follows.

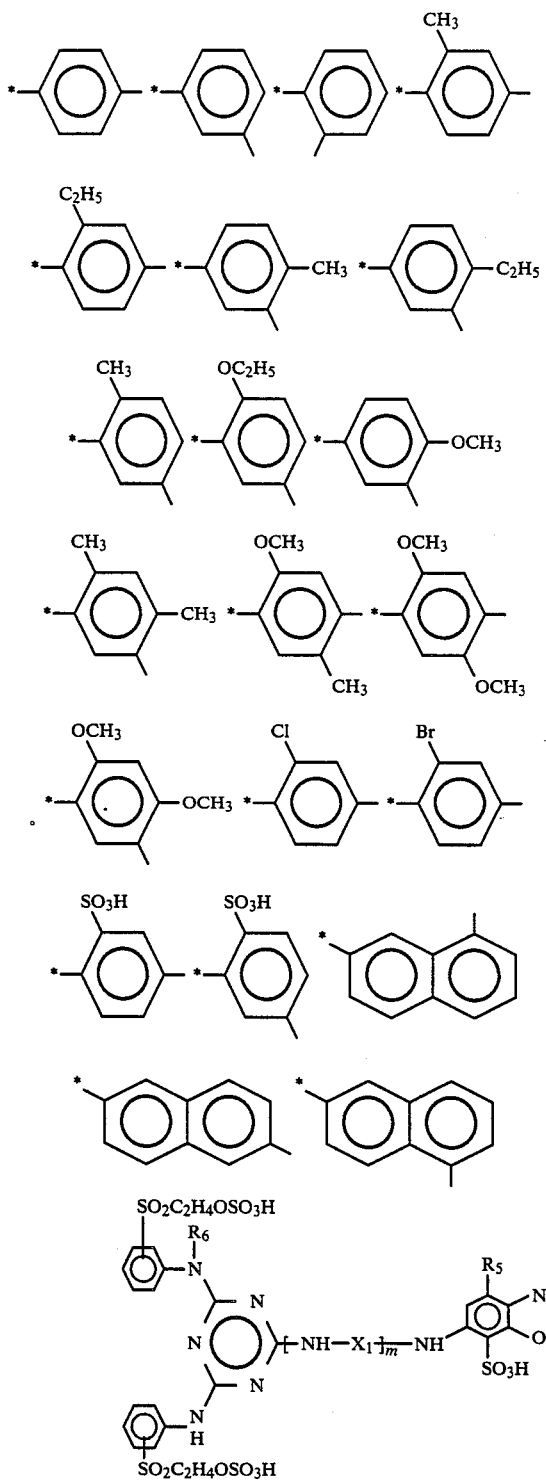

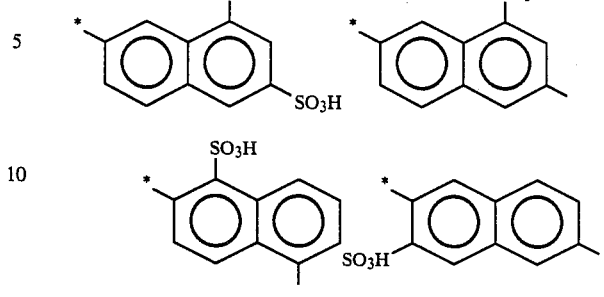

In the above formulas, the asterisked linkage bonds to the group $$-\underset{\underset{R_1}{|}}{N}- \text{ or } -\underset{\underset{R_2}{|}}{N}-.$$

Of these, particularly preferred are phenylene unsubstituted or substituted by methyl, methoxy or sulfo.

With respect to the symbols $Y_1$ and $Y_2$, the group splittable by the action of an alkali represented by the symbol Z, includes sulfato, thiosulfato, phosphato, acetoxy and halogeno. In the present invention, particularly preferred is a case where both $Y_1$ and $Y_2$ are each β-sulfatoethyl, which may be partially replaced by vinyl.

With respect to the symbols $R_1$, $R_2$, $R_3$ and $R_4$, the alkyl is preferably one having 1 to 4 carbon atoms, and may be unsubstituted or substituted by hydroxy, cyano, $C_{1-4}$ alkoxy, halogeno, carbamoyl, carboxy, $C_{1-4}$ alkoxycarbonyl, $C_{1-4}$ alkylcarbonyloxy, sulfo or sulfamoyl. Preferred examples thereof are as those disclosed in Published Unexamined Japanese Patent Application No. 59-122549. Of these, particularly preferred are hydrogen, methyl and ethyl.

Among the dioxazine compounds of the formula (I), particularly preferred is a dioxazine compound represented by the following formula (I-1) in the free acid form,

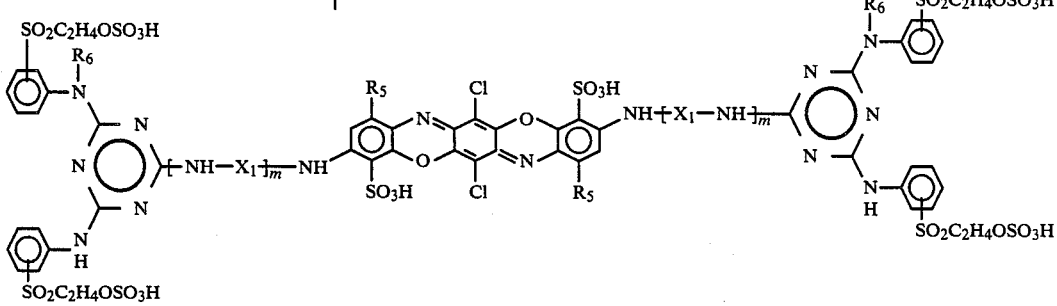

wherein $R_5$ is hydrogen, chloro, methyl, methoxy, ethoxy or sulfo, $X_1$ is ethylene, propylene, phenylene or mono- or di-sulfophenylene, $R_6$ is hydrogen, methyl or ethyl, and m is 0 or 1.

The dioxazine compound of the formula (I) may be in the form of a free acid or a salt such as an alkali metal or alkaline earth metal salt, preferably sodium, potassium or lithium salt.

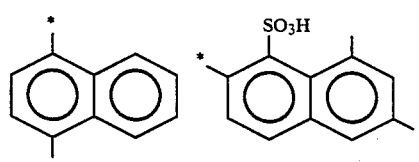

The dioxazine compound (I) of the present invention can be produced readily in a conventional manner. For example, any one of the intermediate dioxazine compound (II), the amine compound (III) and another amine compound (IV) can be subjected to first condensation reaction with a 2,4,6-trihalogeno-s-triazine, followed by second and third condensation reactions using the remaining ones.

Although the condensation reactions can be carried out under optional reaction conditions and the order of the condensation reactions is not limited, the first condensation can be preferably carried out at a temperature of −10° to 40° C. and at a pH ranging from 2 to 9, the second condensation at a temperature of 0° to 70° C. and at a pH ranging from 2 to 9, and the third condensation at a temperature of 10° to 100° C. and at a pH ranging from 2 to 7. The order of the condensation reactions can be determined preferably in such a manner that any compound having the lowest reactivity to the 2,4,6-trihalogeno-s-triazine is subjected to first condensation reaction.

The intermediate dioxazine compound of the formula (II) can be readily prepared in a convention manner, for example, in the following manner.

An aniline compound represented by the following formula (V) in the free acid form,

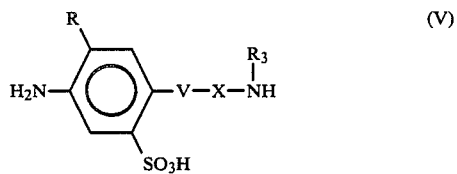

(V)

wherein R, R$_3$, V and X are as defined above, is subjected to condensation with chloranil, thereby obtaining a dianilide compound represented by the following formula (VI) in the free acid form,

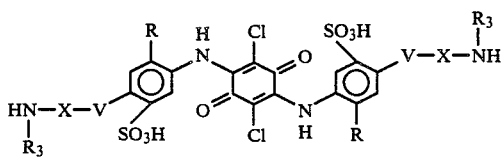

wherein R, R$_3$, V and X are as defined above. The dianilide compound isolated, preferably followed by drying, is then subjected to ring-closure, if desired, in the presence of an oxidizing agent, thereby obtaining the desired intermediate dioxazine compound (II).

After completion of the reaction, the desired dioxazine compound-containing reaction mixture may be formed to a liquid commercial product, if desired, after removing inorganic salts and with addition of a stabilizer or a dyeing improver. The liquid product obtained or the aforesaid reaction mixture may be subjected to evaporation such as spray-drying, thereby obtaining a pulverulent commercial product. Alternatively according to a conventional manner, the reaction mixture may be formed into either a liquid or pulverulent commercial product through salting-out using an electrolyte.

The dioxazine compound (I) of the present invention is fiber-reactive and useful for dyeing or printing hydroxyl group-containing and amide group-containing materials, preferably in a fibrous form or a mixed fibrous form.

The hydroxyl group-containing materials include natural or synthetic hydroxyl group-containing materials such as cellulose fiber materials, regenerated products thereof and polyvinyl alcohol. Examples of the cellulose fiber materials are cotton and other vegetable fiber such as linen, hemp, jute and ramie fibers. Examples of the regenerated cellulose fibers are viscose staple and filament viscose.

The amide group-containing materials include synthetic or natural polyamide polyurethane. Examples of the materials, particularly in the fibrous forms, are wool and other animal furs, silk, leather, polyamide-6,6, polyamide-6, polyamide-11 and polyamide-4.

The dyeing may be carried out in a suitable manner, which can be selected from conventional manners depending on the physical and chemical properties of said fiber materials.

For example, cellulose fiber materials can be dyed using the dioxazine compound by an exhaustion dyeing, padding including cold pad batch-up dyeing or printing method.

The exhaustion dyeing can be carried out at a relatively low temperature in the presence of an acid binding agent such as sodium carbonate, trisodium phosphate, sodium hydroxide and the like, if desired, using a neutral salt such as sodium sulfate, sodium chloride and the like, together with a hydrotropic agent, a penetrant or a level dyeing agent. The neutral salt usable for promoting the exhaustion may be added to a dye bath before or after temperature reaching a desired level for the dyeing, if desired, dividedly.

The printing can be carried out in a one-phase or two-phase manner. The one-phase printing may be conducted by printing the fiber materials with a printing paste containing and acid binding agent such as sodium hydrogencarbonate and the like, followed by steaming at a temperature of 100° to 160° C. The two-phase printing may be conducted by printing the fiber materials with a neutral or weakly acidic printing paste, and passing the materials through a hot alkaline bath containing an electrolyte or over-padding the materials with an alkaline padding liquor containing an electrolyte, followed by a steaming or dry-heating treatment.

For the preparation of the printing paste, a paste or emulsifier such as sodium alginate, starch ether and the like may be used, if desired, together with a conventional auxiliary agent such as urea and/or dispersing agent.

The cold pad batch-up dyeing can be carried out by padding the fiber materials with a padding liquor at ambient temperature, batching up and allowing them to stand on a roller for 3 hours or more or over-night, followed by washing with water and drying. The padding liquor can be prepared in a conventional manner using an acid binding agent such as sodium hydroxide alone or a mixture of sodium hydroxide with sodium silicate, sodium carbonate or trisodium phosphate, and if desired, sodium sulfate or sodium chloride optionally together with a dissolution auxiliary agent such as urea and a penetrant.

The acid binding agent useful for fixing the compound of the present invention on the cellulose fiber materials includes water-soluble basic salts consisting of alkali or alkaline earth metals and inorganic or hydroxides and alkali metal salts of inorganic or organic acids having a weak or medium strength. Particularly preferred are sodium salts and potassium salts. Examples thereof are sodium hydroxide, potassium hydroxide, sodium hydrogenocarbonate, sodium carbonate, sodium formate, potassium carbonate, sodium dihydrogenphosphate, disodium hydrogenphosphate, trisodium phosphate, sodium silicate, sodium trichloroacetate and the like.

The dyeing of natural or synthetic polyamide and polyurethane fiber materials can be carried out by performing exhaustion in an acid or weak acid bath, while controlling the pH value, and then making the bath neutral, or in some cases alkaline to perform the fixation. The dyeing temperature ranges usually from 60° to 120° C. In order to achieve a level dyeing, there may be used a conventional level dyeing agent such as condensation product between cyanuric chloride and 3 times by mole of aminobenzenesulfonic acid or aminonaphthalenesulfonic acid, or an addition product between stearylamine and ethylene oxide, and the like.

The present dioxazine compound can be characterized by superior dye performance in the dyeing and printing of fiber materials, particularly cellulose fiber materials. For example, the present dioxazine compound can exhibit high exhaustion and fixation percentages and superior build-up property as well as superior level-dyeing and washing-off properties and high robustness so that a shade to be obtained can hardly be affected by changes in dyebath conditions such as dyeing temperatures, pH, amounts of inorganic salts and bath ratios, and therefore dyed or printed products with a constant quality can be obtained with superior reproducibility.

Moreover, the dyed or printed products are excellent in fastness properties such as light fastness, perspiration-light fastness, perspiration fastness, acid-hydrolysis fastness, washing fastness and chlorine fastness.

Furthermore, the dyed or printed products are hard to change their color on a fix-treatment or resin-finishing, or in contact with a basic material during storage.

The present invention is illustrated in more detail with reference to the following Examples, with are only illustrative, but not limitative. In Examples, all parts and % are by weight.

EXAMPLE 1

1,4-Diamino-2-methoxybenzene-5-sulfonic acid (218 parts) was dissolved in water (2000 parts), and chloranil (123 parts) was added thereto. The mixture was stirred at 60° C. to complete the reaction, while neutralizing hydrochloric acid generated during the reaction using sodium hydroxide. The reaction mixture was cooled. The crystals isolated and dried were added to 28% oleum (900 parts), and the mixture was stirred at 45° C. to complete the reaction. The reaction mixture was poured into ice water, followed by salting-out to deposit crystals, which were separated to obtain an intermediate dioxazine compound of the following formula in the free acid form.

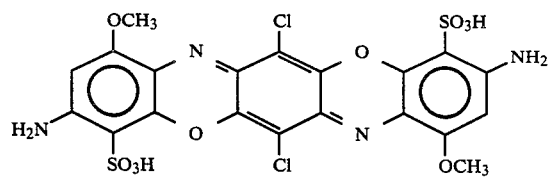

The intermediate dioxazine compound obtained (48.6 parts) and cyanuric chloride (36.9 parts) were placed in water (500 parts) and allowed to react with each other, while neutralizing hydrochloric acid generated during the reaction using sodium carbonate. To this reaction mixture was added 1-N-ethylaminobenzene-3-β-sulfatoethylsulfone (62.7 parts). After completion of the reaction, 1-aminobenzene-3-β-sulfatoethylsulfone (57 parts) was added thereto, and the mixture was stirred to complete the reaction. Salting-out of the reaction mixture, followed by isolation of the crystals gave a dioxazine compound of the following formula in the free acid form.

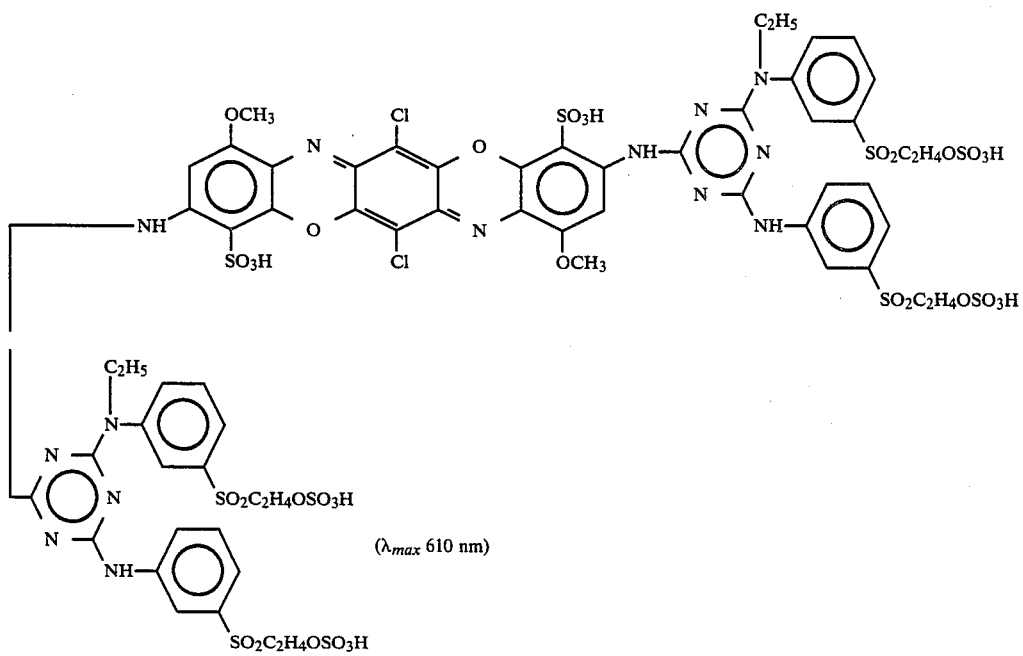

($\lambda_{max}$ 610 nm)

EXAMPLES 2 TO 31

Example 1 was repeated, provided that 1,4-diamino-2-methoxybenzene-5-sulfonic acid used in Example 1 was replaced by the aniline compound of the formula (V) as shown in the following table to obtain the corresponding intermediate dioxazine compound of the formula (II) also as shown below, and the second and third condensation reactions were carried out using the amine compound of the formula (III) as shown below and another amine compound of the formula (IV) also as shown below in place of 1-N-ethylaminobenzene-3-β-sulfatoethylsulfone and 1-aminobenzene-3-β-sulfatoethylsulfone, respectively, thereby obtaining the corresponding dioxazine compound, which was characterized by the color on cotton as shown in the following table.

| Example No. | Aniline compound of formula (V) | Intermediate compound of formula (II) | Amine compound of formula (III) | Another amine compound of formula (IV) | Color on cotton |
|---|---|---|---|---|---|
| 2 | H₂N–C₆H₃(NH₂)(SO₃H) | Dioxazine intermediate with SO₃H, NH₂, Cl, O, N substituents | H₂N–C₆H₄–SO₂C₂H₄OSO₃H (meta) | H₂N–C₆H₄–SO₂C₂H₄OSO₃H (meta) | Reddish blue |
| 3 | H₂N–C₆H₃(NH₂)(SO₃H) | Dioxazine intermediate | C₂H₅–HN–C₆H₄–SO₂C₂H₄OSO₃H | H₂N–C₆H₄–SO₂C₂H₄OSO₃H | Reddish blue |
| 4 | H₂N–C₆H₃(NH₂)(SO₃H) | Dioxazine intermediate | H₂N–C₆H₃(SO₃H)–SO₂C₂H₄OSO₃H | H₂N–C₆H₃(OCH₃)–SO₂C₂H₄OSO₃H | Reddish blue |
| 5 | H₂N–C₆H₃(NH₂)(SO₃H) | Dioxazine intermediate | Naphthalene–NH₂, HO₃SOC₂H₄O₂S | H₂N–C₆H₄–SO₂C₂H₄OSO₃H | Reddish blue |
| 6 | H₂N–C₆H₃(NHC₂H₄NH₂)(SO₃H) | Dioxazine intermediate with NHC₂H₄NH₂ groups | C₂H₅–HN–C₆H₄–SO₂C₂H₄OSO₃H | H₂N–C₆H₄–SO₂C₂H₄OSO₃H | Blue |
| 7 | H₂N–C₆H₃(NHC₂H₄NH₂)(SO₃H) | Dioxazine intermediate | C₂H₅–HN–C₆H₄–SO₂C₂H₄OSO₃H | H₂N-naphthalene(SO₃H)(SO₂C₂H₄OSO₃H) | Blue |
| 8 | H₂N–C₆H₃(NHC₂H₄NH₂)(SO₃H) | Dioxazine intermediate | H₂N-naphthalene(SO₃H)(SO₂C₂H₄OSO₃H) | H₂N–C₆H₃(OCH₃)–SO₂C₂H₄OSO₃H | Blue |

| Example No. | Color on cotton |
|---|---|
| 9 | Reddish blue |
| 10 | Reddish blue |
| 11 | Reddish blue |
| 12 | Blue |
| 13 | Blue |
| 14 | Blue |
| 15 | Reddish blue |

-continued

| Example No. | Aniline compound of formula (V) | Intermediate compound of formula (II) | Amine compound of formula (III) | Another amine compound of formula (IV) | Color on cotton |
|---|---|---|---|---|---|
| 16 | (structure) | (structure) | (structure) | (structure) | Reddish blue |
| 17 | (structure) | (structure) | (structure) | (structure) | Reddish blue |
| 18 | (structure) | (structure) | (structure) | (structure) | Reddish blue |
| 19 | (structure) | (structure) | (structure) | (structure) | Reddish blue |
| 20 | (structure) | (structure) | (structure) | (structure) | Reddish blue |
| 21 | (structure) | (structure) | (structure) | (structure) | Blue |
| 22 | (structure) | (structure) | (structure) | (structure) | Reddish blue |

-continued

| Example No. | Aniline compound of formula (V) | Intermediate compound of formula (II) | Amine compound of formula (III) | Another amine compound of formula (IV) | Color on cotton |
|---|---|---|---|---|---|
| 23 | (structure) | (structure) | (structure) | (structure) | Reddish blue |
| 24 | (structure) | (structure) | (structure) | (structure) | Reddish blue |
| 25 | (structure) | (structure) | (structure) | (structure) | Blue |
| 26 | (structure) | (structure) | (structure) | (structure) | Blue |
| 27 | (structure) | (structure) | (structure) | (structure) | Blue |
| 28 | (structure) | (structure) | (structure) | (structure) | Blue |
| 29 | (structure) | (structure) | (structure) | (structure) | Blue |

| Example No. | Aniline compound of formula (V) | Intermediate compound of formula (II) | Amine compound of formula (III) | Another amine compound of formula (IV) | Color on cotton |
|---|---|---|---|---|---|
| 30 | | | | | Blue |
| 31 | | | | | Blue |
| 32 | | | | | Blue |
| 33 | | | | | Blue |
| 34 | | | | | Reddish blue |
| 35 | | | | | Reddish blue |
| 36 | | | | | Reddish blue |

EXAMPLE 37

The dioxazine compound obtained in Example 1 (each 0.1, 0.3 and 0.6 part) was dissolved in water (200 parts), and sodium sulfate (10 parts) and cotton (10 parts) were added thereto. The bath was heated to 60° C. and then sodium carbonate (4 parts) was added thereto. Dyeing was continued at that temperature for 1 hour. Thereafter, the cotton taken out was washed with water, soaped and dried to obtain each dyed product of a reddish blue superior in fastness properties, particularly chlorine, light and perspiration-light fastness. In the above, the dioxazine compound was found to be superior in build-up property.

EXAMPLE 38

| Composition of color paste | |
| --- | --- |
| Dioxazine compound obtained in Example 1 | 5 parts |
| Urea | 5 parts |
| Sodium alginate (5%), a thickener | 50 parts |
| Hot water | 25 parts |
| Sodium hydrogencarbonate | 2 parts |
| Balance (water) | 13 parts |

Mercerized cotton broad cloth was printed with the color paste of the above composition, pre-dried, steamed at 100° C. for 5 minutes, washed with hot water, soaped, again washed with hot water and then dried to obtain a printed product of a reddish blue color superior in fastness properties.

EXAMPLE 39

Following Examples 32 and 33 with use of each dioxazine compound obtained in Examples 2 to 31 gave each dyed or printed product superior in fastness properties. Each dioxazine compound was also found to have superior build-up property.

What is claimed is:

1. A dioxazine compound represented by the following formula (I) in the free acid form,

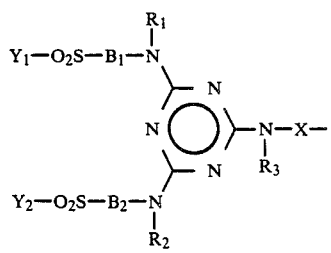

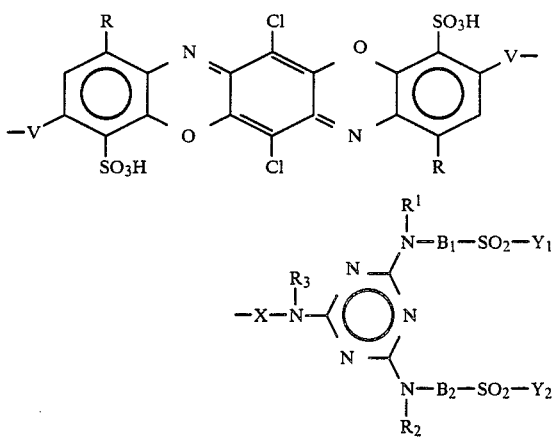

wherein R is hydrogen, halogeno, alkyl, alkoxy or sulfo, V is a direct linkage or

in which $R_4$ is hydrogen or unsubstituted or substituted alkyl, X is a direct linkage or an aliphatic, araliphatic or aromatic bridging group, $B_1$ and $B_2$ independently of one another are each unsubstituted or substituted phenylene or naphthylene, $Y_1$ and $Y_2$ independently of one another are each $-CH=CH_2$ or $-CH_2CH_2Z$ in which Z is a group splittable by the action of an alkali, and $R_1$, $R_2$ and $R_3$ independently of one another are each hydrogen or unsubstituted or substituted alkyl.

2. A dioxazine compound according to claim 1, wherein R is hydrogen, chloro, methyl, methoxy, ethoxy or sulfo.

3. A dioxazine compound according to claim 1, wherein V is a direct linkage or $-NH-$.

4. A dioxazine compound according to claim 1, wherein X is a direct linkage, ethylene, propylene or phenylene unsubstituted or substituted once or twice by sulfo.

5. A dioxazine compound according to claim 1, wherein $R_1$, $R_2$ and $R_3$ independently of one another are each hydrogen, methyl, or ethyl.

6. A dioxazine compound according to claim 1, wherein $B_1$ and $B_2$ independently of one another are each phenylene unsubstituted or substituted once or twice by methyl, ethyl, methoxy, ethoxy, chloro, bromo, nitro, sulfo or carboxy, or naphthylene unsubstituted or substituted by sulfo.

7. A dioxazine compound according to claim 1, wherein both $Y_1$ and $Y_2$ are each $-CH_2CH_2OSO_3H$.

8. A dioxazine compound represented by the following formula (I-1) in the free acid form,

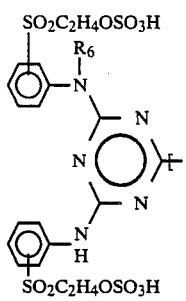 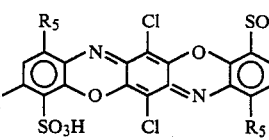 (I-1)

wherein $R_5$ is hydrogen, chloro, methyl, methoxy, ethoxy or sulfo, $X_1$ is ethylene, propylene, phenylene or mono- or di-sulfophenylene, $R_6$ is hydrogen, methyl or ethyl, and m is 0 or 1.

9. A process for producing a dioxazine compound represented by the following formula (I) in the free acid form, one another are each unsubstituted or substituted phenylene or naphthylene, $Y_1$ and $Y_2$ independently of one another are each $-CH=CH_2$ or $-CH_2CH_2Z$ in which Z is a group splittable by the action of an alkali, and $R_1$, $R_2$ and $R_3$ independently of one another are each hydrogen or unsubstituted or substituted alkyl, which comprises subjecting any one of an intermediate dioxazine compound represented by the following formula (II) in the free acid form,

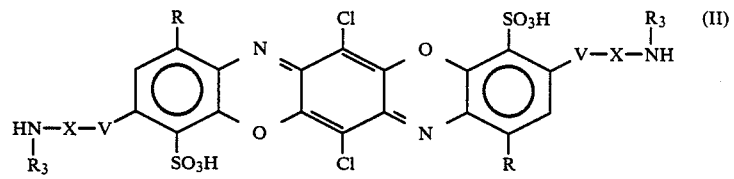 (II)

(I)

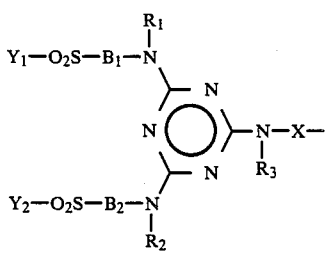

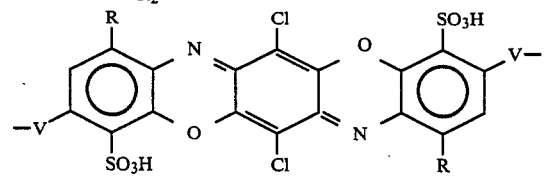

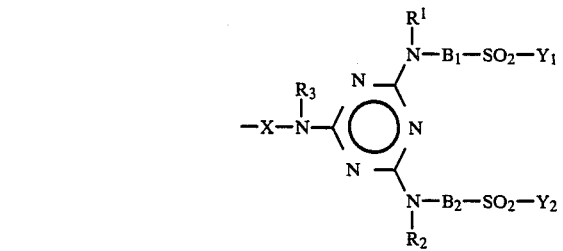

wherein R, V, X and $R_3$ are as defined above, an amine compound represented by the following formula (III),

 (III)

wherein $B_1$, $Y_1$ and $R_1$ are as defined above, and another amine compound represented by the following formula (IV),

 (IV)

wherein $B_2$, $Y_2$ and $R_2$ are as defined above, to first condensation reaction with a cyanuric halide, followed by second and third condensation reactions using the remaining ones.

10. A process for dyeing or printing fiber materials, which comprises using a dioxazine compound represented by the following formula (I) in the free acid form, wherein R is hydrogen, halogeno, alkyl, alkoxy or sulfo, V is a direct linkage or

in which $R_4$ is hydrogen or unsubstituted or substituted alkyl, X is a direct linkage or an aliphatic, araliphatic or aromatic bridging group, $B_1$ and $B_2$ independently of

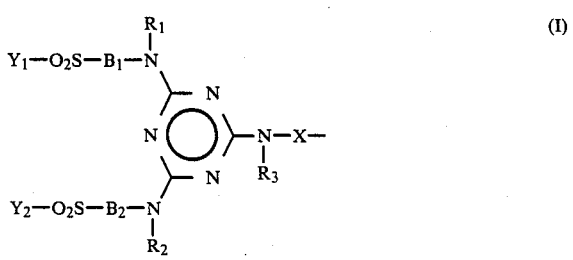 (I)

-continued

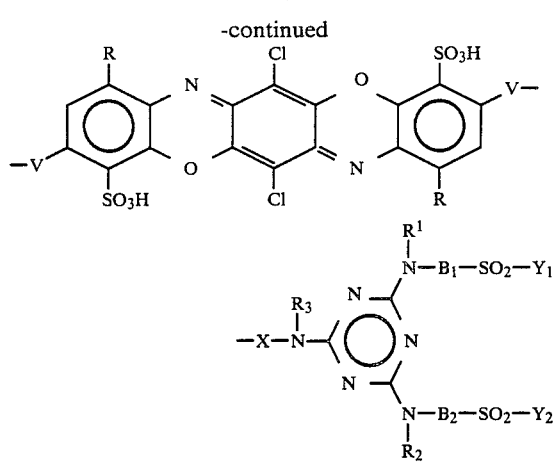

wherein R is hydrogen, halogeno, alkyl, alkoxy or sulfo, V is a direct linkage or

in which $R_4$ is hydrogen or unsubstituted or substituted alkyl, X is a direct linkage or an aliphatic, araliphatic or aromatic bridging group, $B_1$ and $B_2$ independently of one another are each unsubstituted or substituted phenylene or naphthylene, $Y_1$ and $Y_2$ independently of one another are each $-CH=CH_2$ or $-CH_2CH_2Z$ in which Z is a group splittable by the action of an alkali, and $R_1$, $R_2$ and $R_3$ independently of one another are each hydrogen or unsubstituted or substituted alkyl.

11. Fiber materials dyes or printed by the process of claim 10.

* * * * *